United States Patent
Luo et al.

(10) Patent No.: US 8,633,810 B2
(45) Date of Patent: Jan. 21, 2014

(54) REAR-VIEW MULTI-FUNCTIONAL CAMERA SYSTEM

(75) Inventors: Yun Luo, Ann Arbor, MI (US); Dieter Hoetzer, Plymouth, MN (US)

(73) Assignee: Robert Bosch GmbH, Stuttgart (DE)

( * ) Notice: Subject to any disclaimer, the term of this patent is extended or adjusted under 35 U.S.C. 154(b) by 1098 days.

(21) Appl. No.: 12/621,977

(22) Filed: Nov. 19, 2009

(65) Prior Publication Data

US 2011/0115615 A1      May 19, 2011

(51) Int. Cl.
*B60Q 1/00* (2006.01)

(52) U.S. Cl.
USPC ........ 340/436; 340/425.5; 340/933; 340/937; 340/435

(58) Field of Classification Search
USPC ................ 340/425.5, 937, 933, 435, 436
See application file for complete search history.

(56) References Cited

U.S. PATENT DOCUMENTS

| | | | |
|---|---|---|---|
| 7,400,236 B2 | 7/2008 | Kade et al. | |
| 7,432,799 B2 | 10/2008 | Tsuboi | |
| 7,453,374 B2 | 11/2008 | Koike et al. | |
| 7,557,691 B2 | 7/2009 | Iwama | |
| 7,576,639 B2 | 8/2009 | Boyles et al. | |
| 7,633,383 B2 | 12/2009 | Dunsmoir et al. | |
| 7,634,110 B2 | 12/2009 | Oka et al. | |
| 7,663,476 B2 | 2/2010 | Watanabe et al. | |
| 2006/0126899 A1 | 6/2006 | Nagaoka et al. | |
| 2006/0215020 A1 | 9/2006 | Mori et al. | |
| 2007/0126564 A1 | 6/2007 | Lee et al. | |
| 2007/0132567 A1* | 6/2007 | Schofield et al. | 340/438 |
| 2008/0079553 A1 | 4/2008 | Boice | |
| 2008/0231701 A1 | 9/2008 | Greenwood et al. | |
| 2009/0009603 A1 | 1/2009 | Kim | |

FOREIGN PATENT DOCUMENTS

| | | |
|---|---|---|
| EP | 1961622 | 8/2008 |
| EP | 1976296 | 10/2008 |

* cited by examiner

*Primary Examiner* — Daryl Pope
(74) *Attorney, Agent, or Firm* — Michael Best & Friedrich LLP

(57) ABSTRACT

A rear-view camera system for a vehicle. The rear-view camera system includes a first camera positioned on a rear side of the vehicle. The first camera produces a first data set that includes image data corresponding to a first field of view. A second camera is positioned on the rear side of the vehicle spaced a horizontal distance from the first camera. The second camera produces a second data set that includes image data corresponding to a second field of view. The first field of view and the second field of view cover a space adjacent the rear side of the vehicle. An electronic control unit receives the first data set and the second data set and processes the first data set and the second data set to determine the presence of an object in the space adjacent the rear side of the vehicle. The electronic control unit is configured to stitch the first data set and the second data set to produce a panoramic image that corresponds to the space adjacent the rear side of the vehicle. A human-machine interface includes a viewing screen positioned adjacent an operator of the vehicle, and the human-machine interface is configured to receive the panoramic image and display the panoramic image on the viewing screen.

32 Claims, 8 Drawing Sheets

REAR-VIEW MULTI-FUNCTIONAL CAMERA SYSTEM

BACKGROUND

The present invention relates to a rear-view multi-functional camera system.

There are various situations in which it is desirable to see or sense behind or to the rear of an automobile or other vehicle. In most instances, the requirements of one vision application will vary from the requirements of other applications. For example, the requirements of a rear-vision or rear-view camera system in a passenger vehicle often differ from the requirements of a rear-vision or rear-view camera system in a commercial truck.

SUMMARY

Due, at least in part, to the different sensing coverage behind the vehicles in different vision applications, system designers have struggled to find one single sensing configuration that fulfills most applications with sufficient data integrity.

The present invention provides a rear-view configuration that covers up to a 180° field of view with high image resolution for viewing purposes behind the vehicle. It also provides high-integrity depth and motion information for multiple functionalities including vehicle comfort systems and vehicle safety systems. The camera system operates under both forward and reverse driving conditions.

Vehicle sensing systems used in vehicles can be used to alert an operator of the vehicle to adverse conditions that exist or are predicted to occur in the future. Such vehicle sensing systems may alert a driver to the presence of an object behind the vehicle when driving in reverse, calculate the motion of an object, and predict a potential collision and time of collision, provide a virtual image of the objects behind the vehicle, calculate distances, actively control safety features in a vehicle, actively control braking action and steering angle of a vehicle, and perform other functions. The vehicle sensing system of the present invention performs multiple functions, eliminating the need for multiple sensing systems.

In one embodiment, the invention provides a rear-view camera system for a vehicle. The rear-view camera system includes a first camera positioned on a rear side of the vehicle. The first camera produces a first data set that includes image data corresponding to a first field of view. A second camera is positioned on the rear side of the vehicle spaced a horizontal distance from the first camera. The second camera produces a second data set that includes image data corresponding to a second field of view. The first field of view and the second field of view cover a space adjacent the rear side of the vehicle. An electronic control unit receives the first data set and the second data set and processes the first data set and the second data set to determine the presence of an object in the space adjacent the rear side of the vehicle. The electronic control unit is configured to stitch the first data set and the second data set to produce a panoramic image that corresponds to the space adjacent the rear side of the vehicle.

The camera system includes a human-machine interface ("HMI") that has a viewing screen positioned adjacent an operator of the vehicle. The HMI is configured to receive the panoramic image and display the panoramic image on the viewing screen.

In another embodiment, the invention provides a method of detecting an object adjacent a rear side of a vehicle. The method includes acquiring a first image data set that corresponds to a first space positioned adjacent the rear side of the vehicle, and acquiring a second image data set that corresponds to a second space positioned adjacent the rear side of the vehicle. The method also includes mapping the first image data set to a first pixel array, mapping the second image data set to a second pixel array, and calculating a correspondence between the first pixel array and the second pixel array to produce a third image data set that includes a first zone, a second zone, and a third zone. The method further includes calculating a driving corridor that corresponds to a predicted path of motion of the vehicle, initially attempting to determine the presence of an object in the first zone, attempting to determine the presence of an object in one of the second zone and the third zone if no object was detected in the first zone, determining a potential collision between the object with the vehicle corridor, and calculating a time to collision.

Other aspects of the invention will become apparent by consideration of the detailed description and accompanying drawings.

DETAILED DESCRIPTION

Figure 1:
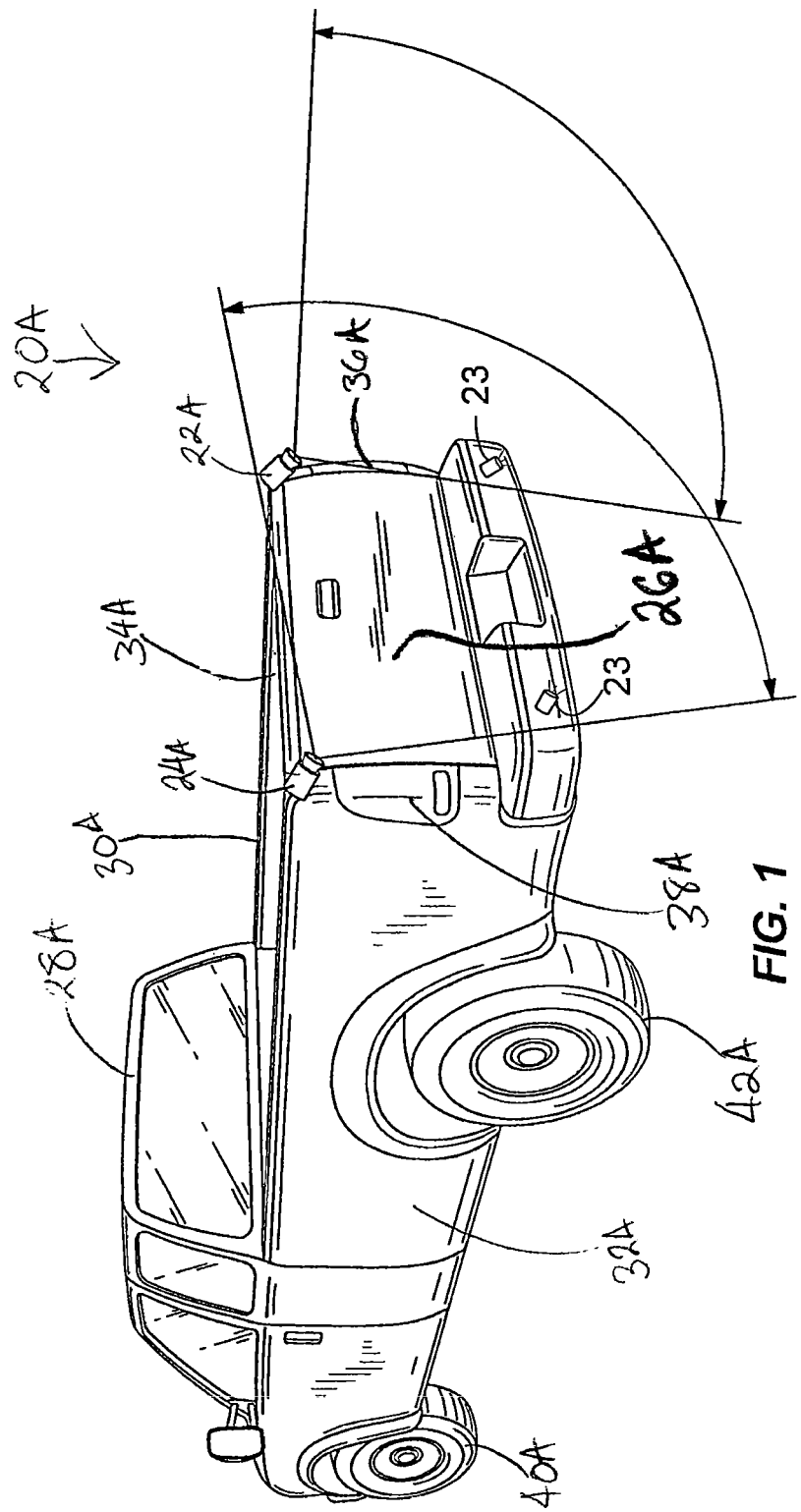
FIG. 1 illustrates the mounting positions and fields of view of two cameras on the back of a truck.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A rear-view camera system 20 provides multiple functionalities with the use of two cameras 22, 24 mounted on the rear side 26 of a vehicle 28. It is to be understood that the cameras 22, 24 may be mounted on other suitable surfaces of the vehicle 28 (e.g., rear, side, top, or underside), whereby the cameras are able to monitor the space adjacent the rear side 26 of the vehicle. The rear-view camera system 20 captures digitized images from a space positioned adjacent the rear side 26 of the vehicle 28. Image data from the cameras 22, 24 is provided to an electronic processing unit 29 (FIG. 3), also referred to as an electronic control unit ("ECU") which may include a programmable microprocessor, memory, operating system software, and other related components. Conditioning circuits or peripheral drivers ("C/D") 30 and 31 may be used to interface the electronic processing unit 29 with the cameras 22, 24.

FIG. 1 illustrates a vehicle 28 in the form of a truck 28A that includes a rear-view camera system 20A. The rear-view camera system 20A includes a first camera 22A (herein referred to as a right camera) mounted near a right side 30A of the truck 28A and a second camera 24A (herein referred to as a left camera) mounted near a left side 32A of the truck 28A. The right and left cameras 22A, 24A are similar and operate in a similar manner. The right and left cameras 22A, 24A both have a field of view ("FOV") of approximately 100 degrees. The right camera 22A is mounted near a top surface 34A of the truck 28A above a right taillight 36A, and the left camera 24A is mounted near the top surface 34A of the truck 28A above a left taillight 38A. The right camera 22A is directed toward the left side 32A of the truck 28A such that the right camera 22A acquires image data corresponding to the space positioned immediately behind the truck 28A toward the left side 32A. The left camera 24A is directed toward the right side 30A of the truck 28A such that the left camera 24A acquires image data corresponding to the space positioned immediately behind the truck toward the right side 30A.

In other constructions, the right camera 22A can be different (e.g., have a different FOV) than the left camera 24A. The FOVs of the cameras typically range from 90 degrees to 130 degrees. In some constructions, the cameras 22A and 24A are mounted in different positions on the truck 28A, or the cameras 22A and 24A are aimed in different directions.

The truck 28A also includes a pair of front wheels 40A and a pair of rear wheels 42A. During operation of the truck 28A, an operator steers the front wheels 40A to direct the truck 28A in a desired direction. As is known, turning can occur regardless of whether the vehicle is moving forward (a forward mode) or in reverse (a reverse mode).

Figure 2:
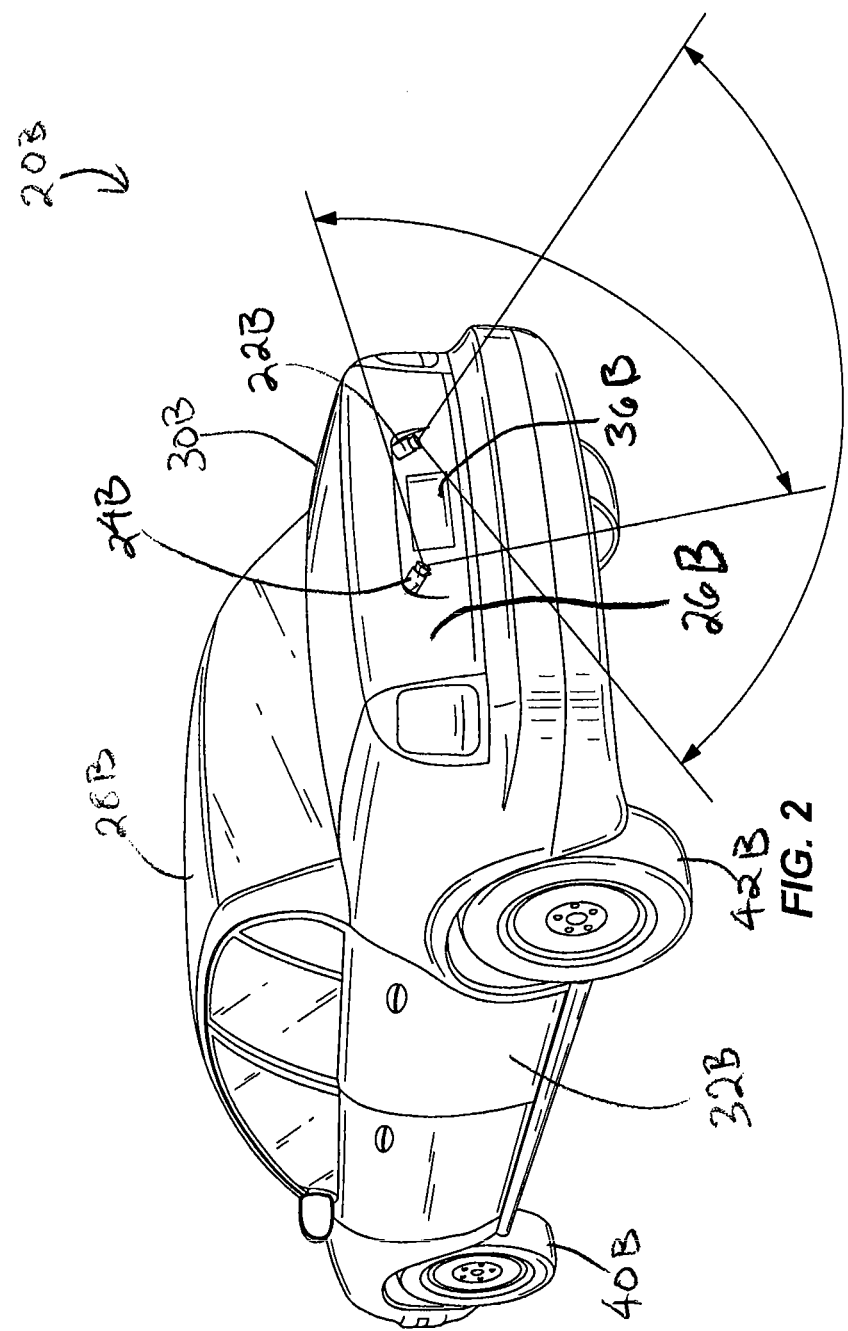
FIG. 2 illustrates the mounting positions and fields of view of two cameras on the back of a car.

FIG. 2 illustrates a vehicle 28 in the form of a car 28B that includes a rear-view camera system 20B. The rear-view camera system 20B is similar to the rear-view camera system 20A illustrated in FIG. 1. Like components have been given like reference numerals and will be discussed briefly. The rear-view camera system 20B includes a right camera 22B mounted near a right side 30B of the car 28B and a left camera 24B mounted near a left side 32B of the car 28B. The left and right cameras 22B and 24B are similar and operate in a similar manner. The right and left cameras 22B and 24B each have a FOV of approximately 100 degrees. The right camera 22B is positioned adjacent a license plate 36B and is directed toward the left side 32B of the car 28B such that the right camera 22B acquires image data corresponding to the space positioned immediately behind the car 28B toward the left side 32B. Similarly, the left camera 24B is positioned adjacent the license plate 36B and is directed toward the right side 30B of the car 28B such that the left camera 24B acquires image data corresponding to the space positioned immediately behind the car 28B toward the right side 30B.

In some embodiments, including those illustrated in FIGS. 1 and 2, the cameras used are CMOS- or CCD-type cameras and capture image streams continuously in the visible spectrum, the infrared spectrum, the near infrared ("NIR") spectrum, or a combination. In one embodiment, the cameras are sensitive to light having a wavelength in the range of about 400 nm to about 1000 nm, and an IR filter is used on the cameras to block wavelengths above about 1200 nm. In some embodiments, the vehicle or the cameras are equipped with NIR light sources 23 (e.g., LEDs) to provide illumination of areas of interest. Equipping the vehicle, cameras, or both with NIR light sources helps improve the quality of images obtained by the cameras, particularly at night.

Figure 3:
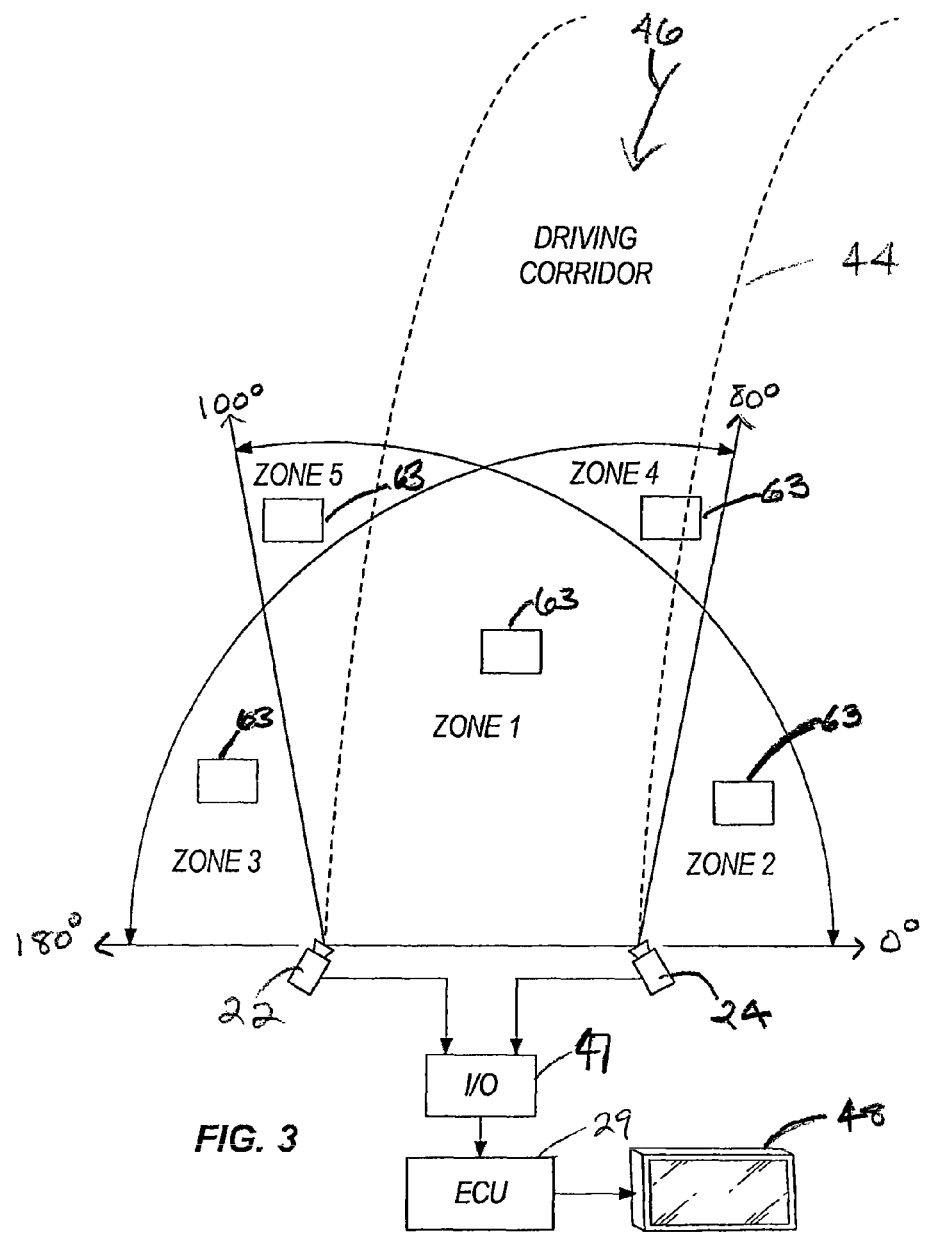
FIG. 3 is a diagram illustrating the spatial imaging coverage of each of two cameras mounted on a vehicle and an electronic control unit that processes the images obtained by the two cameras.

FIG. 3 schematically illustrates the space adjacent the rear side 26 of the vehicle 28 in planar view. The right camera 22 has a FOV of 100 degrees and acquires images from 0 degrees to 100 degrees, as defined in FIG. 3. The left camera 24 has a FOV of 100 degrees and is positioned such that the left camera 24 acquires images from 80 degrees to 180 degrees, as defined in FIG. 3. The cameras 22 and 24 are positioned such that their respective FOVs overlap and the cameras 22 and 24 have a combined FOV of 180 degrees. In the embodiment shown, the imaged space is defined by five zones. Zone 1 is positioned directly behind the vehicle 28 and includes all the space imaged by both the right camera 22 and the left camera 24. Zone 2 is positioned behind and to the left of the vehicle 28 and includes all the space imaged by only the right camera 22. Zone 3 is positioned behind and to the right of the vehicle 28 and includes all the space imaged by only the left camera 24. Zone 4 is positioned behind the vehicle 28 toward the left side 32 and is imaged by only the left camera 24. Zone 5 is positioned behind vehicle 28 toward the right side 30 and is imaged by only the right camera 22.

FIG. 3 also illustrates an exemplary driving corridor 44. When the vehicle 28 is driven in a forward direction, the vehicle 28 moves in a direction defined by arrow 46. When the vehicle 28 is driven in a reverse direction, the vehicle 28 moves in a direction opposite the arrow 46. Specifically, the front wheels 40 and the rear wheels 42 travel substantially along the driving corridor 44 as the vehicle 28 moves.

Figure 4:
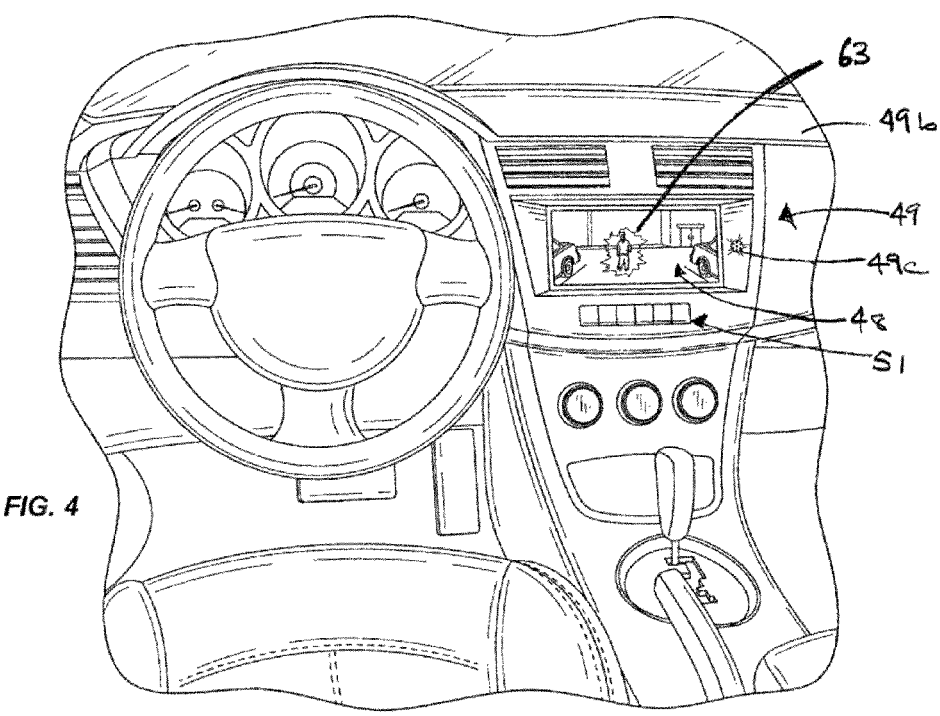
FIG. 4 illustrates a human-machine interface including a viewing screen that displays images obtained by the two cameras of FIG. 1 or FIG. 2 to a vehicle operator.

In operation, when the operator turns on the vehicle 28, power is provided to the ECU 29 of the vehicle 28. As noted, the ECU 29 includes hardware and software and these components cooperate to execute the logic of the rear-view camera system 20. As shown in FIG. 3, an input/output ("I/O") interface 47 obtains images from the cameras 22, 24 and provides the images to the ECU 29. The I/O interface 47 may process the images from the cameras 22, 24 before providing the images to the ECU 29. Depending on the vehicle's direction of movement, the ECU 29 outputs images (e.g., panoramic images produced from images obtained from the cameras 22, 24) to a viewing screen 48. As shown in FIG. 4, the viewing screen 48 is part of a human-machine interface ("HMI") 49. The HMI 49 is positioned on a dashboard 49b of the vehicle and provides information to a vehicle operator in various formats. In addition to the viewing screen 48, the HMI 49 includes a speaker 49c for providing audible information to the vehicle operator and one or more warning lights or light emitting diodes ("LEDs") 51 for providing visual information to the vehicle operator. In some embodiments, the HMI 49 also includes one or more haptic interfaces for providing tactile information to the vehicle operator, such as vibrations or movements in the vehicle's steering wheel, seat, brake pedal, etc.

When the vehicle 28 is operated in the forward mode (i.e., when the operator drives the vehicle 28 in the forward direction 46), the rear-view camera system 20 provides multiple systems and functionalities. The rear-view camera system 20 provides rear-end collision mitigation using video-based vehicle detection algorithms. One of the ways in which the consequences of a collision are mitigated is by using the information generated by the system 20 to pre-activate restraint systems. For example, if information from the system 20 indicates that a rear-end collision is imminent, headrests are moved into a position that better protects vehicle occupants, seat belts are pre-tensioned, air-bags readied to deploy, or a combination thereof. Information from the system 20 is also provided (in some embodiments) to an automatic emergency braking system. Automatic emergency braking enhancement is achieved by determining the speed of the vehicle 28 as well as the speed and following distance of a second vehicle traveling behind the vehicle 28. If the vehicle 28 is equipped with a forward-looking camera, radar, or lidar system and that system is generating information that would cause deployment of automatic emergency braking due to an imminent forward collision, and the system 20 is simultaneously generating information that a rear collision is imminent, information from the system 20 is provided to the forward-looking system so that the forward-looking system takes both events into consideration and determines a control compromise to achieve an improved, overall safety result. The rear-view camera system 20 also provides a lane departure warning ("LDW") system and a lane keeping system ("LKS") by detecting the lane markers behind the vehicle and fitting lane models to predict the relative vehicle position in the lane. The system can also detect other vehicles in blind spots of a mirror or approaching fast from behind for lane-change assist. In other words, if the system is operating while the vehicle is moving forward (for example, traveling 120 kph on a highway), information generated by the system can be used to provide blind-spot detection and lane-change assistance.

When the vehicle 28 is in a reverse mode (i.e., when the operator drives the vehicle 28 in the reverse direction), the rear-view camera system 20 provides multiple systems and functionalities that may be similar to or different than the functionalities provided when operating the vehicle 28 in the forward direction. The rear-view camera system 20 provides high-quality rear-view video stream with a 180 degree FOV, distortion correction, and obstacle highlighting, as explained in more detail below. The rear-view camera system 20 provides a back-over warning system with audible, visible, and haptic feedback. Some examples of audible feedback include beeps and voice alerts. Examples of visible feedback include light emitting diodes ("LEDs") on the dashboard of the vehicle and object highlighting. Examples of haptic feedback include brake vibration, steering wheel vibration, seat vibration, safety belt vibration, brake jerk, etc. The ECU may also actively control the brake to partially or fully stop or steer the vehicle to avoid collision. The rear-view camera system also provides brake pre-charge, a back-over avoidance system with active braking, video-based obstacle detection, an automatic parking system that accurately detects open space and obstacles, and a cross traffic alert system that detects objects with a crossing motion.

FIGS. 5-8 illustrate the operation of the rear-view camera system 20 after the vehicle 28 is turned on. At step 52, the right and left cameras 22 and 24 acquire image data corresponding to one frame or image. The right and left cameras 22 and 24 are video cameras and acquire data in a substantially continuous manner. For simplicity, one iteration through the logic of FIGS. 5-8 will be explained in detail. It is to be understood that the logic is executed rapidly by the ECU 29 and the data is acquired and displayed in a substantially continuous manner.

As illustrated at step 52, the right camera 22 acquires a frame of image data in the form of a right image data array, and the left camera 24 acquires a frame of data in the form of a left image data array. Each image data array is an array of pixels that corresponds to the respectively imaged spaces. At step 53, the image correspondence is calculated between the right image data array and the left image data array. The right and left image data arrays are acquired synchronously (i.e., at substantially the same time) and thus include pixels in Zone 1 that correspond to the same three-dimensional points in space. Because the cameras 22 and 24 are positioned on opposite sides of the vehicle 28, the space corresponding to Zone 1 is imaged from different perspectives. The correspondence calculation determines which pixels in the right data array and in the left data array correspond to the same point in three-dimensional space. At step 54, the result of the correspondence calculation is used to determine a depth map for Zone 1. More specifically, the depth map is calculated in Zone 1 from a disparity calculation.

The ground plane (i.e., the set of data that corresponds to the surface that supports the vehicle 28) is assumed to be present in every image data array and is, therefore, removed from the depth map at step 56. Thus, only objects positioned above the ground plane remain in the depth map. A segmentation is performed on the depth map at step 58. From the segmented data, object recognition is performed (step 60) to determine the presence of any objects of interest positioned in Zone 1 (i.e., in the depth map) using extract descriptors. The extract descriptors include image features (e.g., intensity, color, texture, etc.), three-dimensional shape information, and others. Performing obstacle recognition using the extract descriptors allows further classification of the objects of interest. Thus, false positives are reduced, and objects can be identified in Zone 1 (step 62).

As shown in FIG. 3, each Zone may include an object 63, such as a shopping cart or child. The ECU 29 uses extract descriptors to identify these objects 63 within a particular zone. When an object is present in the depth map, the vehicle data is acquired (step 64). Vehicle data can include a velocity, acceleration, steering angle, etc. The vehicle corridor is predicted based on the steering angle and the location of the centroid of the vehicle. The vehicle corridor has a width approximately equal to the width of the vehicle. The predicted vehicle corridor has a polynomial curve that depends on the steering angle of the vehicle and the vehicle dynamics particular to the car (such as wheel base, weight, velocity, and acceleration). The vehicle corridor changes over time (assuming that the vehicle is moving).

The objects 63 identified in step 60 are tracked and equations are used to determine whether the tracked object can collide with the driving corridor. Specifically, it is determined whether the tracked object is on a collision path with the driving corridor at step 70.

If the vehicle is in reverse mode, (determined at step 72), the ECU 29 produces a panoramic image (e.g., an approximately 180 degree image) from the image data acquired by the right and left cameras 22 and 24 at step 74. The ECU 29 produces a panoramic image using image stitching. Image stitching combines or "stitches" together multiple images with overlapping fields of view to produce a single panoramic image. Image stitching includes multiple steps or processes, such as calibrating the individual images, registering the images using direct or feature-based image alignment methods to determine image orientation and overlaps, and blending the multiple images to combine overlapping sections and correct errors or distortions. The panoramic image can also be generated in a manner that provides a different perspective (e.g., an aerial view as opposed to an elevational view) by performing image transformation (to change the perceived viewing angle) followed by stitching of the transformed images. In such an embodiment, the system also includes an input or selection mechanism (e.g., an actual or virtual button in the cockpit of the vehicle) so that the driver can select or choose which perspective or point of view of the panoramic image is displayed to the driver.

After generating the panoramic image at step 74, the ECU 29 highlights any tracked objects in the panoramic image at step 76 before displaying the panoramic image to the operator at step 78. As shown in FIG. 4, the ECU 29 displays the panoramic image to the operator on the viewing screen 48 of the HMI 49.

Regardless of whether the vehicle is in reverse mode or forward mode, a warning is produced (step 80) through the HMI 49 when an object is on a collision path with the driving corridor. The warning is produced by highlighting, marking, or flashing tracked objects in a panoramic image displayed on the viewing screen 48, illuminating one of the warning lights 51, outputting an audible alert with the speaker 49c, and/or generating a tactile warning with a haptic interface (see FIG. 4). If the operator does not react or fails to respond to the warning, the system reacts or responds by calculating the time to collision (TTC) at step 86. The TTC is compared to a predefined threshold. If the TTC is below the threshold and the vehicle is moving in reverse, the system directs active braking to avoid a collision (step 90). In other words, the rear view camera system generates a braking command, and the braking system so informed or activated forms an active braking system. When a collision is unavoidable, additional safety features are activated (e.g., seatbelt, headrest, etc.) during collision mitigation (step 88). These additional components, particularly when activated or informed by the rear-view camera system, form a collision mitigation system. The collision mitigation system receives data such as object type, collision speed, collision position, etc. and reacts accordingly by sending signals to safety devices such as seatbelts, air bags, active head rests, and the like.

If no object is detected in Zone 1 (step 62), then Zones 2 and 3 are processed. (To reduce the amount of computation, when an object is detected in Zone 1, Zones 2 and 3 are not examined.) The previous image data for Zones 2 and 3, also referred to as adjacent image data, is stored in a buffer. As best seen by reference to FIG. 6, correspondence is calculated between the current image data for Zone 2 and the previous image data for Zone 2 (step 92). Similarly, correspondence is calculated between the current image data for Zone 3 and the previous image data for Zone 3 (step 92).

From the correspondence data, optical flow is performed to calculate a motion flow map for Zones 2 and 3 at step 94. Optical flow is performed using the correspondence from the current and previous image data. The optical flow is assumed to be caused only by objects in Zones 2 and 3 because the motion map is only calculated when 1) the vehicle is in reverse mode and 2) no objects are detected during step 62 of FIG. 5. (Although, the disparity calculation for Zone 1 is always active, a potential back-over collision along the driving corridor has significance (only) when the vehicle is in reverse mode. However, detection of an object in Zone 1 could be due to a relatively fast-moving object approaching from behind, which could, depending on the situation, lead to a rear-end collision or a front-end collision (e.g., if the object is approaching faster than the vehicle can drive away.) The pixels corresponding to objects in Zones 2 and 3 are assumed to be moving in the same height to simplify the equations and because only crossing motion is relevant. Thus, the motion is transformed to the plan view. In addition, the vehicle ego-motion (e.g., vehicle speed, vehicle direction, steering angle, etc.) is known and the real motion of a pixel or object can be determined from the vehicle ego-motion and the tracked motion. Only real motion toward Zone 1 and toward the driving corridor is considered relevant. Other motion is ignored. The motion pixels are clustered to determine whether a potential object is moving toward the vehicle and whether the potential object is on a collision path with the driving corridor (step 106). If no objects are detected that are on a collision path, then new right and left image data arrays are acquired (at step 50) and the process repeats.

If an object in Zone 2 or 3 is determined to be on a collision path (step 106), then the vehicle mode is determined. If the vehicle 28 is in reverse mode, (determined at step 110), a panoramic image is produced at step 112 (e.g., using image stitching as described above for step 74), and the tracked object is highlighted or marked in the panoramic image at step 114. The panoramic image is then displayed to the operator on the viewing screen 48 of the HMI 49 (see FIG. 4) at step 116.

A warning is produced (step 118) through the HMI 49 (regardless of the forward or reverse mode or movement of the vehicle). The warning is produced by highlighting, marking, or flashing tracked objects in a panoramic image displayed on the viewing screen 48, illuminating one of the warning lights 51, outputting an audible alert with the speaker 49c, and/or generating a tactile warning with a haptic interface (see FIG. 4). If the operator does not react to the warning (step 122), the system calculates the time to collision (TTC) at step 128. If the TTC is below a predefined threshold, the system directs active braking to avoid a collision (step 134). When a collision is unavoidable, additional safety features are activated (e.g., seatbelt, headrest, etc.) during collision mitigation (step 132). As noted above, collision mitigation is based on data such as object type, collision speed, collision position, etc.

Figure 5:
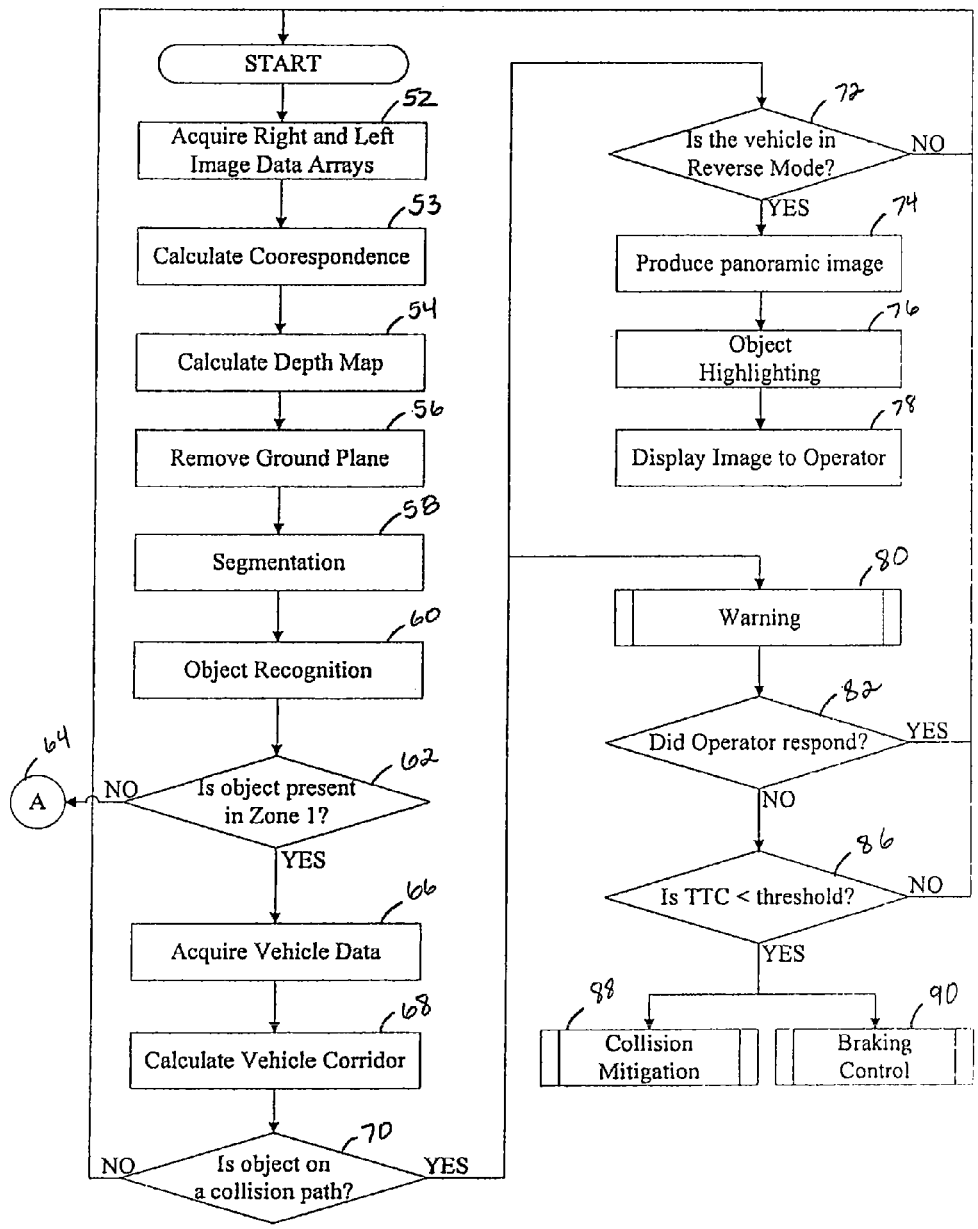
FIG. 5 illustrates the logic performed by the rear-view camera system of FIGS. 1 and 2.
Figure 6:
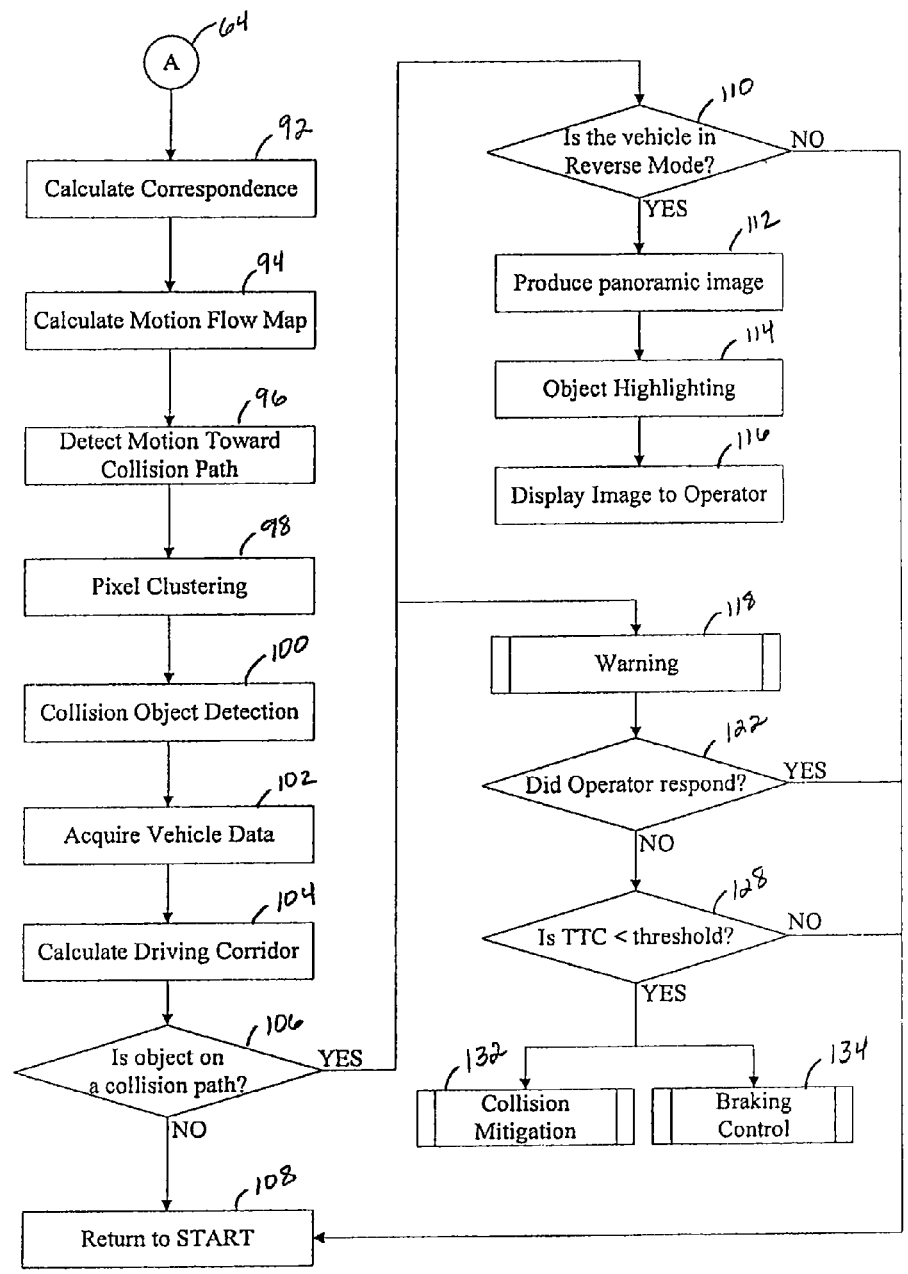
FIG. 6 is a continuation of the logic of FIG. 5.
Figure 7:
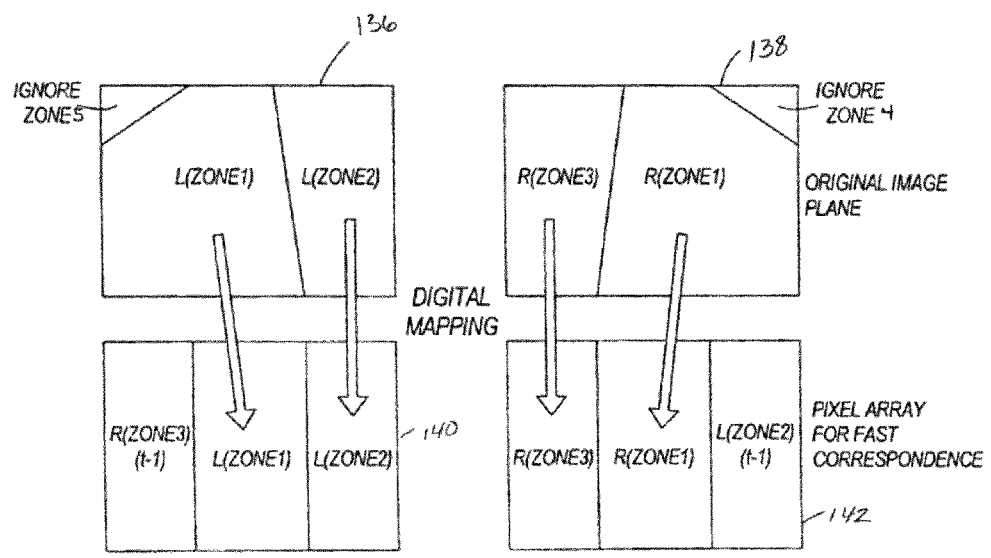
FIG. 7 illustrates the digital mapping performed by the logic of FIGS. 5 and 6.

Due to the complexity of the correspondence calculations performed at step 52 of FIG. 5 and step 92 of FIG. 6, the image data is digitally mapped before being processed. FIG. 7 visually illustrates the digital mapping performed on the image data arrays. The cameras 22 and 24 each have a different perspective view, which results in zones that are not structured in a uniform manner. Thus, digital mapping is performed on the image data to transform the image data into a more structured format. Digital mapping describes image transformation such as stretching or compressing some areas of an image to normalize the use of pixel data. Some examples of digital mapping are image distortion correction, perspective transformation, and projection. Certain areas in the image data may be considered more important or more useful than other areas. The important areas can be modified to increase the digitized pixel resolution, and the less important areas can be modified to decrease the pixel resolution. Digital mapping in the plan view also allows the non-uniformity issue to be solved. The non-uniformity issue results from a camera view with a pitch angle that results in too many pixels in the near range. After digital mapping, the imaged space is perceived uniformly. As illustrated in FIG. 7, the image data is restructured into data blocks to allow a faster correspondence calculation.

As illustrated in FIG. 1, the right camera 22 is mounted on the right side 30 of the vehicle 28 and is aimed toward the left side 32 of the vehicle 28. The image data acquired from the right camera 22 is schematically illustrated in FIG. 7 as an array 136. The image data in array 136 corresponds to the left side 32 and includes L(Zone 1), L(Zone 2), and Zone 5. Similarly, the image data acquired from the left camera 24 is schematically illustrated as an array 138. The image data in array 138 corresponds to the right side 30 and includes R(Zone 1), R(Zone 3), and Zone 4. Digital mapping is performed to evenly distribute the data of the arrays 136 and 138 into corresponding sections or data blocks so the correspondence calculations may be performed quicker. More specifically, the image data corresponding to Zone 1 in array 136 is mapped to Zone 1 in array 140, the image data corresponding to Zone 2 in array 136 is mapped to Zone 2 in array 140, and the image data corresponding to Zone 5 in array 136 is ignored. The right camera 22 has a field of view that does not include the image data corresponding to Zone 3. Thus, the image data corresponding to Zone 3 from the previous data set is added to array 140 as the data for Zone 3. A similar digital mapping is performed for array 138. The mapped array 142 includes the mapped data corresponding to Zone 1 and Zone 3 of array 138. The image data in Zone 4 of array 138 is ignored. The left camera 24 has a field of view that does not include the data corresponding to Zone 2. Thus, the previous data set for Zone 2 is added to array 142 as the data for Zone 2. Each array 140 and 142 is stored in a different data buffer.

Figure 8:
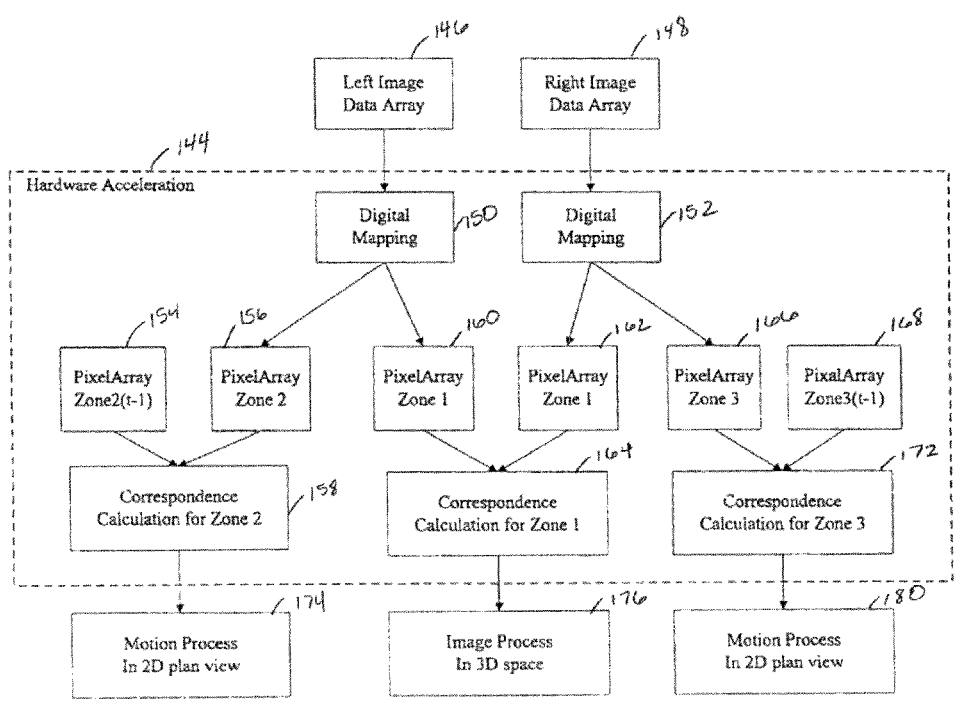
FIG. 8 illustrates the logic used to improve the processing speed of the logic of FIGS. 5 and 6.

FIG. 8 illustrates the logic for the hardware-accelerated, correspondence calculation 144. The logic includes digital mapping and data alignment (steps 150 and 152), as discussed with respect to FIG. 7. Data alignment is the restructuring of the image data arrays into corresponding data blocks, which are used in each correspondence calculation. Correspondence calculations are used to calculate the depth map and optical flow using the information in the remapped arrays 140 and 142. As illustrated, the previous data for Zone 2 (step 152) as well as the current data for Zone 2 (step 156) is used in the correspondence calculation for Zone 2 (step 158). The data corresponding to Zone 1 from each array 140 and 142 (steps 160 and 162) is used for the correspondence calculation of Zone 1 (step 164). The data corresponding to the previous data for Zone 3 (step 168) and the current data for Zone 3 (step 166) is used in the correspondence calculation for Zone 3 (step 172).

Correspondence calculations are large and take a long time to compute when high accuracy and robustness are desired. Thus, to further accelerate the speed of the correspondence calculations, the correspondence calculations are performed in parallel using a specially designed structured element machine in computational devices or a parallel hardware architecture such as field programmable gate arrays ("FPGAs") and application specific integrated circuits ("ASICs"). Of course, other hardware can be used to accelerate the calculations.

Thus, the invention provides, among other things, a multi-functional rear-view camera system that provides a variety of collision mitigation and avoidance systems. Various features and advantages of the invention are set forth in the following claims.

What is claimed is:

1. A rear-view camera system for a vehicle, the rear-view camera system comprising:
   a first camera positioned on a rear side of the vehicle, the first camera producing a first data set that includes image data corresponding to a first field of view;
   a second camera positioned on the rear side of the vehicle spaced a horizontal distance from the first camera, the second camera producing a second data set that includes image data corresponding to a second field of view, the first field of view and the second field of view covering a space adjacent the rear side of the vehicle;
   an electronic control unit that receives the first data set and the second data set and processes the first data set and the second data set to determine a presence of an object in the space adjacent the rear side of the vehicle, the electronic control unit configured to stitch the first data set and the second data set to produce a panoramic image that corresponds to the space adjacent the rear side of the vehicle; and
   a human-machine interface that includes a viewing screen positioned adjacent an operator of the vehicle, the human-machine interface configured to receive the panoramic image and display the panoramic image on the viewing screen.

2. The rear-view camera system of claim 1, wherein the electronic control unit calculates a driving corridor, determines a time to collision of the object with the vehicle within the driving corridor, and provides a warning to the operator of the vehicle.

3. The rear-view camera system of claim 2, wherein the warning is one of an audible warning, a visual warning, and a haptic warning.

4. The rear-view camera system of claim 2, wherein the warning includes highlighting the object in the panoramic image.

5. The rear-view camera system of claim 2, further comprising a collision mitigation system and a braking system, the collision mitigation system and the braking system configured to operate in response to determining a failure of the operator to respond to the warning.

6. The rear-view camera system of claim 1, wherein the space adjacent the rear side of the vehicle defines a field of view of between 100 degrees and 180 degrees.

7. The rear-view camera system of claim 1, wherein the space adjacent the rear side of the vehicle defines a field of view of 180 degrees or more.

8. The rear-view camera system of claim 1, wherein the image data is a video stream of image data.

9. The rear-view camera system of claim 1, further comprising hardware configured for parallel processing of the image data.

10. The rear-view camera system of claim 9, wherein the hardware includes one of an application specific integrated circuit, and a field programmable gate array.

11. The rear-view camera system of claim 1, wherein the electronic control unit calculates a driving corridor, determines a time to collision of the object with the vehicle within the driving corridor, and information generated by the electronic control unit is used to provide at least one of a blind-spot warning and a lane-change indicator.

12. The rear-view camera system of claim 1, wherein the electronic control unit changes a viewing angle of the panoramic image in response to user input.

13. The rear-view camera system of claim 1, wherein the first and second camera are operable to capture image streams in the visible spectrum and the infrared spectrum.

14. The rear-view camera system of claim 1, further comprising infrared light sources operable to illuminate the first field of view and the second field of view with infrared light.

15. The rear-view camera system of claim 1, wherein the first camera and the second camera are positioned such that first field of view partially overlaps the second field of view, and wherein the electronic control unit is configured to stitch the first data set and the second data set by incorporating image data corresponding to a non-overlapping portion of the first field of view, image data corresponding to a non-overlapping portion of the second field of view, and combined image data corresponding to overlapping portions of the first field of view and the second field of view into a single panoramic image.

16. A rear-view camera system for a vehicle, the rear-view camera system comprising:
   a first camera positioned on a rear side of the vehicle, the first camera producing a first data set that includes image data corresponding to a first field of view;
   a second camera positioned on the rear side of the vehicle spaced a horizontal distance from the first camera, the second camera producing a second data set that includes image data corresponding to a second field of view, the first field of view and the second field of view covering a space adjacent the rear side of the vehicle;
   an electronic control unit that receives the first data set and the second data set and processes the first data set and the second data set to determine a presence of an object in the space adjacent the rear side of the vehicle, the electronic control unit configured to stitch the first data set and the second data set to produce a panoramic image that corresponds to the space adjacent the rear side of the vehicle; and a human-machine interface that includes a viewing screen positioned adjacent an operator of the vehicle, the human-machine interface configured to receive the panoramic image and display the panoramic image on the viewing screen, and further comprising a braking system and a forward-looking collision detection system, wherein imminent rear-collision information from the electronic control unit is provided to the forward-looking collision detection system, and wherein the forward-looking collision detection system is configured to control the braking system based on both the imminent rear-collision information and detecting an imminent forward collision.

17. A method of detecting an object adjacent a rear side of a vehicle, the method comprising:
acquiring, with a first camera, a first image data set that corresponds to a first space positioned adjacent the rear side of the vehicle;
acquiring, with a second camera, a second image data set that corresponds to a second space positioned adjacent the rear side of the vehicle;
in an electronic processing unit,
mapping the first image data set to a first pixel array;
mapping the second image data set to a second pixel array;
calculating a correspondence between the first pixel array and the second pixel array to produce a third image data set;
calculating a driving corridor that corresponds to a predicted path of motion of the vehicle;
determining a presence of the object in the third image data set;
determining a potential collision between the object and the driving corridor; and
calculating a time to collision.

18. The method of claim 17, wherein the mapping of the first image data set and the mapping of the second image data set is performed by one of an application specific integrated circuit and a field programmable gate array.

19. The method of claim 17, further comprising determining if the vehicle is operating in a reverse mode, and, if the vehicle is operating in the reverse mode, producing a panoramic image corresponding to the first space and the second space and displaying the panoramic image to an operator of the vehicle.

20. The method of claim 19, further comprising highlighting the object in the panoramic image.

21. The method of claim 19, changing a viewing angle of the panoramic image in response to user input.

22. The method of claim 17, wherein the third image data set includes image data that corresponds to a space positioned directly behind the rear side of the vehicle.

23. The method of claim 17, providing at least one of a blind-spot warning and a lane-change indicator based on information generated by the electronic processing unit.

24. The method claim 17, wherein acquiring the first image data set and the second image data set includes capturing image streams in the visible spectrum and the infrared spectrum.

25. The method of claim 17, further comprising illuminating the first field of view and the second field of view with infrared light.

26. The method of claim 17, wherein the first space partially overlaps the second space, and further comprising:
generating a panoramic image incorporating image data corresponding to a non-overlapping portion of the first space, image data corresponding to a non-overlapping portion of the second space, and combined image data corresponding to overlapping portions of the first space and the second space; and
displaying the panoramic image on a viewing screen positioned adjacent to an operator of the vehicle.

27. A method of detecting an object adjacent a rear side of a vehicle, the method comprising:
acquiring, with a first camera, a first image data set that corresponds to a first space positioned adjacent the rear side of the vehicle;
acquiring, with a second camera, a second image data set that corresponds to a second space positioned adjacent the rear side of the vehicle;
in an electronic processing unit,
mapping the first image data set to a first pixel array;
mapping the second image data set to a second pixel array;
calculating a correspondence between the first pixel array and the second pixel array to produce a third image data set;
calculating a driving corridor that corresponds to a predicted path of motion of the vehicle;
determining a presence of the object in the third image data set;
determining a potential collision between the object and the driving corridor;
calculating a time to collision;
calculating a depth map for the image data that corresponds to the space positioned directly behind the rear side of the vehicle; and
calculating a motion map for adjacent image data of the third image data set, the adjacent image data corresponding to space adjacent to the space positioned directly behind the rear side of the vehicle.

28. The method of claim 17, further comprising warning an operator of the vehicle when the potential collision is determined.

29. The method of claim 28, wherein warning the operator includes one of providing an audible warning, a visible warning, and a haptic warning.

30. The method of claim 28, further comprising detecting a failure of the operator to respond to the warning and actively braking to attempt to avoid the collision in response to the failure.

31. The method of claim 28, further comprising detecting a failure of the operator to respond to the warning, comparing the time to collision to a threshold, and providing at least one of collision mitigation and active braking when the time to collision is less than the threshold.

32. A method of detecting an object adjacent a rear side of a vehicle, the method comprising:
acquiring, with a first camera, a first image data set that corresponds to a first space positioned adjacent the rear side of the vehicle;
acquiring, with a second camera, a second image data set that corresponds to a second space positioned adjacent the rear side of the vehicle;
in an electronic processing unit,
mapping the first image data set to a first pixel array, mapping the second image data set to a second pixel array,
calculating a correspondence between the first pixel array and the second pixel array to produce a third image data set,
calculating a driving corridor that corresponds to a predicted path of motion of the vehicle,
determining a presence of the object in the third image data set,
determining a potential collision between the object and the driving corridor, and
calculating a time to collision;
providing imminent rear-collision information from the electronic processing unit to a forward-looking collision detection system based on the potential collision and the time to collision;
detecting an imminent forward collision; and
providing control signals from the forward-looking collision detection system to a braking system based on both the imminent rear-collision information and detecting the imminent forward collision.

* * * * *